United States Patent [19]

Wood et al.

[11] Patent Number: 4,655,540
[45] Date of Patent: Apr. 7, 1987

[54] HOLOGRAPHIC OPTICAL DISPLAY SYSTEM WITH OPTIMUM BRIGHTNESS UNIFORMITY

[75] Inventors: Robert B. Wood, Hillsboro; Jen-Lih Hung, Beaverton; Norman S. Jee, Portland, all of Oreg.

[73] Assignee: Flight Dynamics, Inc., Portland, Oreg.

[21] Appl. No.: 726,125

[22] Filed: Apr. 23, 1985

[51] Int. Cl.⁴ .......................... G02B 5/32; G02B 27/14
[52] U.S. Cl. ........................................ 350/3.7; 350/174
[58] Field of Search .................................. 350/3.7, 174

[56] References Cited

PUBLICATIONS

M. J. Chern, P. L. Dobbs, and G. E. Moss, "Holographic Laser Visor Mock-Up," Final Report, N62269-79-C-0288, Hughes Aircraft Company, Jun. 1981.

*Primary Examiner*—Bruce Y. Arnold
*Attorney, Agent, or Firm*—Stoel, Rives, Boley, Fraser & Wyse

[57] ABSTRACT

An optical display system employs a holographic optical element that has a holographic fringe pattern which is coordinated with the phosphor emission peak of a cathode ray tube to eliminate perceptible variations in image brightness. The holographic optical element has a reflection characteristic that defines two diffraction efficiency peaks which are resolved by a low diffraction efficiency dip that is interposed between them. The optimum wavelength spacing between the two diffraction efficiency peaks for a given wavelength spacing is determined by computing for all observer head positions and look angles of concern the differences among the areas under the integrated efficiency characteristics for the reflection characteristic of the holographic optical element and the phosphor emission characteristic of the image-producing cathode ray tube. The optimum wavelength spacing is that which provides the desired variation among the computed difference values, which respresent the display brightness uniformity. The center dip reflection characteristic increases the spectral bandwidth of the holographic optical element and thereby increases its reflectivity to promote good contrast with the use of a cathode ray tube operating at reduced beam current levels. When installed as a combiner in a head-up display sytem for aircraft, the holographic optical element superimposes the image on an outside scene without introducing significant discoloration of the scene.

19 Claims, 8 Drawing Figures

4,655,540

HOLOGRAPHIC OPTICAL DISPLAY SYSTEM WITH OPTIMUM BRIGHTNESS UNIFORMITY

BACKGROUND OF THE INVENTION

The present invention relates to optical display systems, and in particular, an optical display system that comprises a holographic optical element which reflects light image information toward an observer so that he can view the information from anywhere within a head motion volume and not perceive variations in image brightness.

The problems with prior optical display systems relating to image brightness uniformity and display contrast ratio are exemplified by those experienced with head-up display systems for aircraft.

The design of conventional head-up display systems that employ spectrally insensitive dielectric combiners entails a trade-off between real-world photopic transmission through and cathode ray tube energy reflection by the combiner. The photopic transmission and energy reflection characteristics of a combiner affect the contrast ratio of the display for a given image source light output and an observer's ability to view image information against an ambient background of high brightness. A typical spectrally insensitive dielectric combiner has a 70% maximum transmissivity and a 20% maximum reflectivity. The 20% maximum reflectivity indicates that 80% of the light energy emanating from the cathode ray tube never reaches the observer. To produce a light output of sufficient intensity for an acceptable contrast ratio against a background of high brightness, the cathode ray tube must be driven at a high beam current, which has the deleterious effect of shortening its usable life. Combiners constructed of spectrally insensitive dielectric materials, therefore, do not promote good contrast in a head-up display system of efficient design.

Holographic combiners have heretofore been used in head-up display systems to ameliorate the trade-off between real-world scene photopic transmission and cathode ray tube energy reflection. The reason is that wavelength selectivity is a natural attribute of a hologram.

Although a hologram can reflect or diffract a narrow band of wavelengths with high efficiency, there exists a duality between the spectral bandwidth and angular bandwidth of a hologram, which duality creates difficulties in achieving image brightness uniformity over an entire field of view or with pilot head motion. A hologram at a fixed angle has a finite spectral bandwidth because during playback its diffraction efficiency diminishes rapidly as the wavelength of cathode ray tube energy varies from the peak efficiency wavelength, i.e., the Bragg wavelength condition. Similarly, the hologram has a finite angular bandwidth because it does not reflect light rays of the cathode ray tube wavelength at angles outside of a narrow range centered about the Bragg angle. The peak efficiency wavelength and angle are established during the hologram exposure and processing.

Providing a display image of perceptibly uniform brightness requires, therefore, that the hologram reflection characteristic be tailored to present such an image to the observer, irrespective of the position of his head within a specific head motion volume. The head motion volume is defined as the region in space through which the observer can move his head and see a display image. Achieving brightness uniformity is a problem because of the combined effects of the hologram reflection and cathode ray tube phosphor emission characteristics at the head-center position of the head motion volume. Since the hologram has angular bandwidth, the reflection efficiency diminishes as the observer moves his head in the vertical direction from the head-center position. The reflection efficiency near the vertical limits of the head motion volume is generally insufficient to promote acceptable brightness uniformity of the display image.

One proposed solution to the problem of brightness uniformity is the construction of a hologram of sufficient angular bandwidth that covers the expected range of vertical head motion. The disadvantages of the conventional wide band hologram approach are that there is rejection of a wide band of wavelengths from the real-world scene as viewed from the combiner, which results in poor photopic transmission; excessive real-world coloration or tinting; and perceptible brightness variations. The use of a wide band hologram introduces, therefore, a trade-off among photopic transmission, real-world coloration, and brightness uniformity.

A wide band hologram designed with a nonsaturated peak diffraction efficiency results in a corresponding increase in spectral bandwidth that improves the brightness uniformity across the field of view. There exist, however, several problems with the nonsaturated hologram. First, the integrated efficiencies of the hologram reflection and cathode ray tube phosphor emission characteristics are so low that the cathode ray tube must be driven at a relatively high beam current to maintain an acceptable contrast ratio against backgrounds of high brightness. (Integrated efficiency is defined herein to mean the area under the curve which is the multiplication product of the hologram reflection characteristic and the cathode ray tube phosphor emission characteristic for a given head position and look angle.) Driving the cathode ray tube in this manner decreases its usable life. Second, a nonsaturated hologram is typically constructed in a relatively thin recording material. The sensitivity of the integrated efficiency of the thin hologram imposes strict thickness control requirements for good brightness uniformity. Third, variations in the transmissivity of the hologram result from variations in its integrated efficiencies.

The design of head-up display systems that employ spaced-apart, partly overlapping lower and upper reflective coatings involves an additional consideration as respects the use of wide band holograms to improve image brightness uniformity. The lower combiner must reflect simultaneously the image information emanating from the cathode ray tube at angles larger than the critical Bragg cutoff angle and transmit the same image information at angles smaller than the critical Bragg cutoff angle. Increasing the spectral bandwidth of the lower combiner improves brightness uniformity but does not permit the efficient transmission of image information through the lower combiner to the upper combiner.

SUMMARY OF THE INVENTION

One object of the present invention is, therefore, to provide in an optical display system a holographic optical element of sufficient angular bandwidth that superimposes for viewing by an observer image information of perceptibly uniform brightness on a scene with insignificant real-world discoloration.

Another object of this invention is to provide such a holographic optical element whose diffraction efficiency characteristic is designed in coordination with the phosphor emission characteristic of a cathode ray tube to eliminate perceptible variations in image brightness.

A further object of this invention is to provide such a display system that achieves a good contrast ratio against a background of high brightness without necessitating the use of a cathode ray tube beam current of a magnitude that shortens its usable life.

Still another object of this invention is to provide a head-up display system that employs lower and upper holographic combiners and achieves both image brightness uniformity and efficient image transmission from the lower to the upper combiner.

Yet another object of this invention is to provide a method of making a holographic optical element whose diffraction efficiency characteristic is formulated for use in a display system to eliminate perceptible variations in image brightness.

The present invention overcomes the disadvantages inherent in prior optical display systems by employing a holographic optical element with a holographic fringe pattern that is coordinated with the phosphor emission peak of a cathode ray tube to eliminate perceptible variations in brightness. The holographic optical element is described by way of example as part of a combiner element in a head-up display system for aircraft.

The holographic optical element has a viewing surface and is operable to superimpose image information on a scene viewed by a pilot. The holographic optical element has holographic fringes that define two diffraction efficiency peaks which cause the holographic optical element to reflect into the pilot's eyes a display of light image information with enhanced brightness uniformity across its viewing surface. The two diffraction efficiency peaks are resolved by a low diffraction efficiency dip that is interposed between them. The diffraction efficiency peaks correspond to different wavelengths of light that are separated by typical amounts of between 10 and 20 nanometers. The low diffraction efficiency dip corresponds to a wavelength spectrally positioned preferably near the center between the two diffraction efficiency peak wavelengths. In a preferred embodiment, the two diffraction efficiency peaks are achieved in a single emulsion of holographic recording material by double exposure of the emulsion with light emanating from a single point source located in two different positions. The resulting hologram is, therefore, called the "center dip" hologram. The midpoint of the distance between the two point source locations corresponds to the design eye location of the display system as positioned in the aircraft cockpit.

The bandwidths and peak efficiencies of the two hologram diffraction efficiency peaks are controlled by the exposure energy and not directly by the thickness of the holographic recording material. The wavelength spacing between diffraction efficiency peaks is controlled by changing the distance between or the construction angles of the two exposure locations. A hologram designed in accordance with the present invention provides uniform performance, which is repeatable for successive holograms, over the entire hologram surface.

Additional objects and advantages of the present invention will be apparent from the following detailed description of a preferred embodiment thereof, which proceeds with reference to the accompanying drawings.

DETAILED DESCRIPTION OF A PREFERRED EMBODIMENT

General Description of Display System

Figure 1:
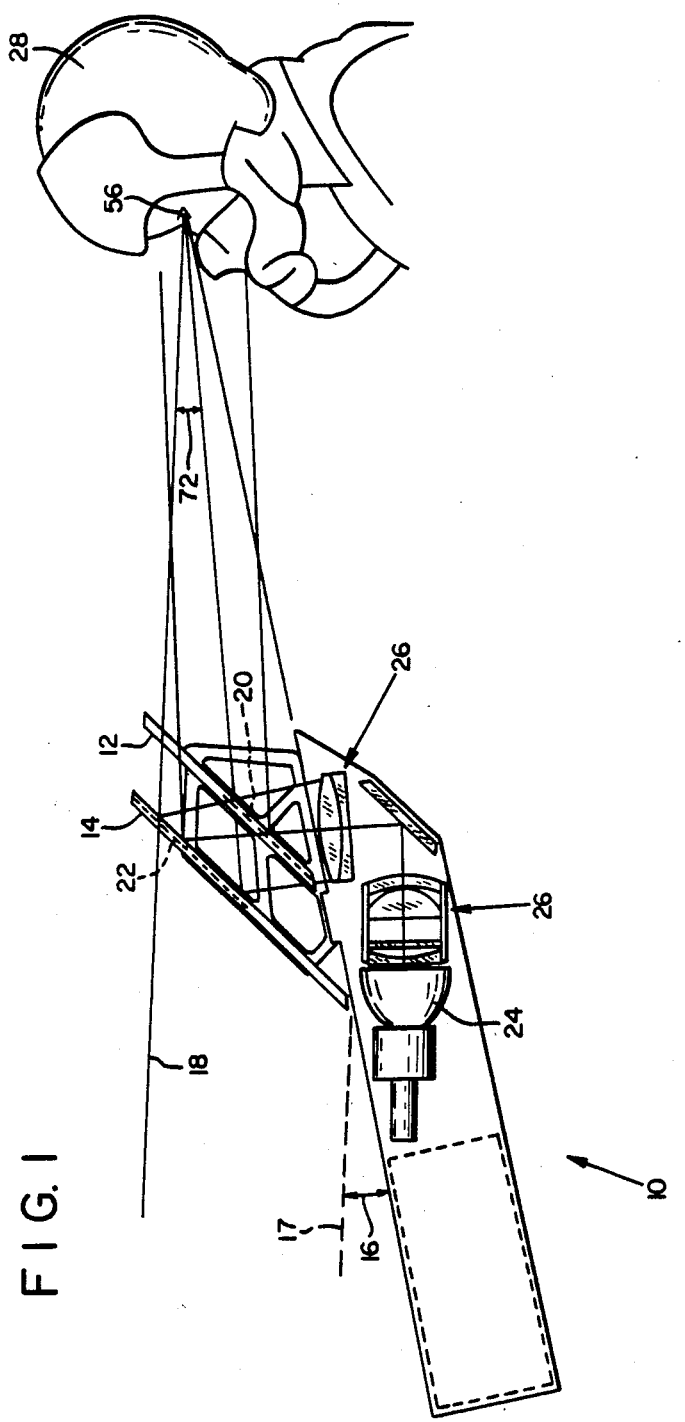
FIG. 1 is a fragmentary side elevation view of a head-up display system that employs two combiners, each including a holographic optical element constructed in accordance with the invention.

FIG. 1 shows a diagram of a head-up display system 10 that is mounted in the cockpit area of an aircraft and employs two holographic optical elements that function as combiners and include holograms constructed in accordance with the present invention.

With reference to FIG. 1, head-up display system 10 employs a lower combiner 12 and an upper combiner 14 that are positioned in spaced-apart, generally parallel relation. The perpendicular distance between combiners 12 and 14 is about 4.6 cm. Display system 10 is inclined at an angle 16 of $-15°$ in a counterclockwise sense relative to reference line 17, which is parallel to the horizon line 18 as shown. Lower combiner 12 comprises a hologram 20 that is enclosed between a pair of substantially flat, transparent substrates and spans about 50% of the surface area of the combiner. Upper combiner 14 comprises a hologram 22 that is enclosed between two substantially flat, transparent substrates and spans about 60% of the surface area of the combiner.

Light image information emanating from an image source means 24, such as a cathode ray tube, is collimated by a collimating lens assembly 26 and reflected by either or both of combiners 12 and 14 to the eyes of the observer or pilot 28. Collimating lens assembly 26 is of a conventional design which conditions the image information so that it appears to originate from optical infinity. Combiners 12 and 14 together constitute a viewing surface by which pilot 28 can simultaneously view an outside scene and the image information without a change in eye focus.

Depending on the angle at which they strike the surface of the lower combiner 12, the collimated light rays reach pilot 28 by reflection from either lower combiner 12 or upper combiner 14. (There is a small region in which both combiners reflect the same image information. This region represents the area of the viewing surface where the reflection bands of the holograms 20 and 22 partly overlap each other.) The pilot sees different portions of the image information as he changes his head position and look angle. The image information changes, therefore, with a change in the pilot's instantaneous field of view. Holograms 20 and 22 are constructed so that variations in image brightness resulting from head motion or changes in look angle are minimized so that they are not perceptible to pilot 28.

Center Dip Hologram Design Characteristics

The design of holograms 20 and 22 comprising the respective combiners 12 and 14 may be best explained with reference to the graphs shown in FIGS. 2A-2B and FIG. 3.

Figure 2A:
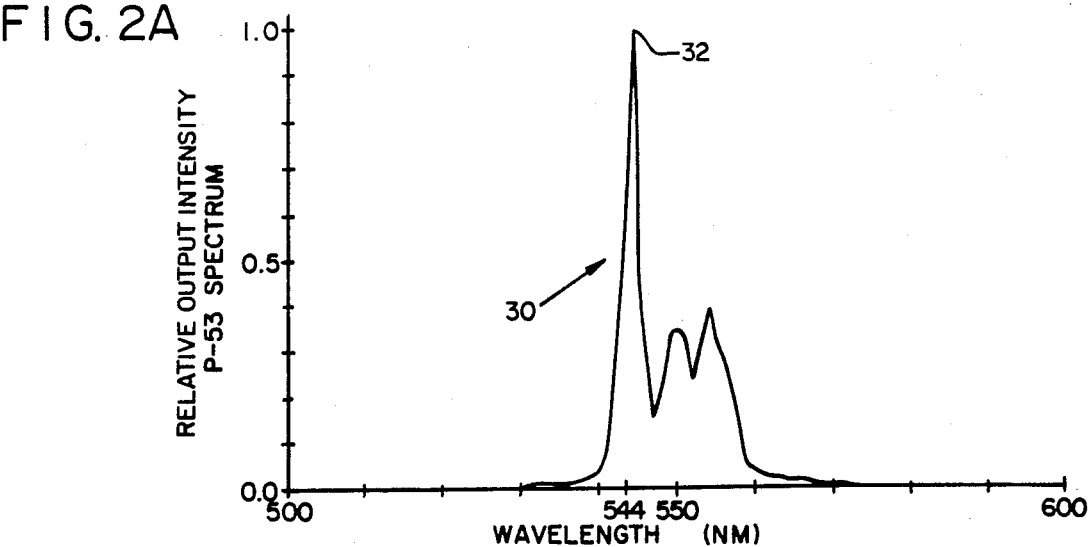
FIGS. 2A and 2B are graphs of, respectively, the usable portion of the emission characteristic of a P-53 type phosphor and the diffraction efficiency characteristic of a holographic optical element constructed in accordance with the invention.

FIG. 2A shows the usable portion of the emission characteristic 30 of a P-53 type phosphor, which has an emission peak 32 at a first wavelength of about 544 nanometers and its usable portion of energy contained within a bandwidth of about 20 nanometers. A cathode ray tube 24 that employs a P-53 phosphor requires a beam current of relatively low magnitude to maintain the desired contrast ratio when used in association with the hologram of this invention.

Figure 2B:
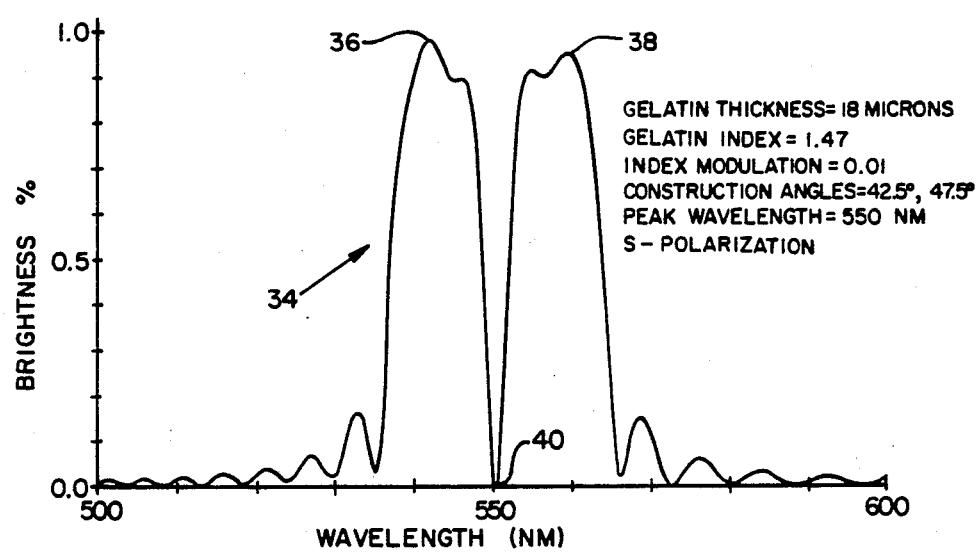

FIG. 2B shows for the center of the display the diffraction efficiency or reflection characteristic 34 of either one of holograms 20 and 22 as viewed from the design eye location 56, which is defined as the center point of the head motion volume. The hologram characteristic 34 has two closely spaced diffraction efficiency peaks 36 and 38 corresponding to second and third wavelengths of, respectively, 542.25 nanometers and 557.25 nanometers. A low diffraction efficiency notch or dip 40 at a wavelength of about 550 nanometers is interposed between diffraction efficiency peaks 36 and 38. (Diffraction efficiency characteristic 34 effectively represents the superposition of the diffraction efficiency characteristics of two holograms of different peak wavelengths.) Although it has a low diffraction efficiency dip 40, diffraction efficiency characteristic 34 spans a wider band of wavelengths than either one of its single hologram constituents.

The design objective is to determine the wavelength spacing between peaks 36 and 38 which optimize the reflectivity of the hologram for all head positions and look angles of concern. Computing the integrated efficiency characteristic of the system is a means by which one determines the optimum wavelength spacing between peaks 36 and 38. The integrated efficiency characteristic is the curve which represents the multiplication product of the P-53 phosphor emission characteristic and the hologram diffraction efficiency characteristic for a given head position and look angle.

Figure 3:
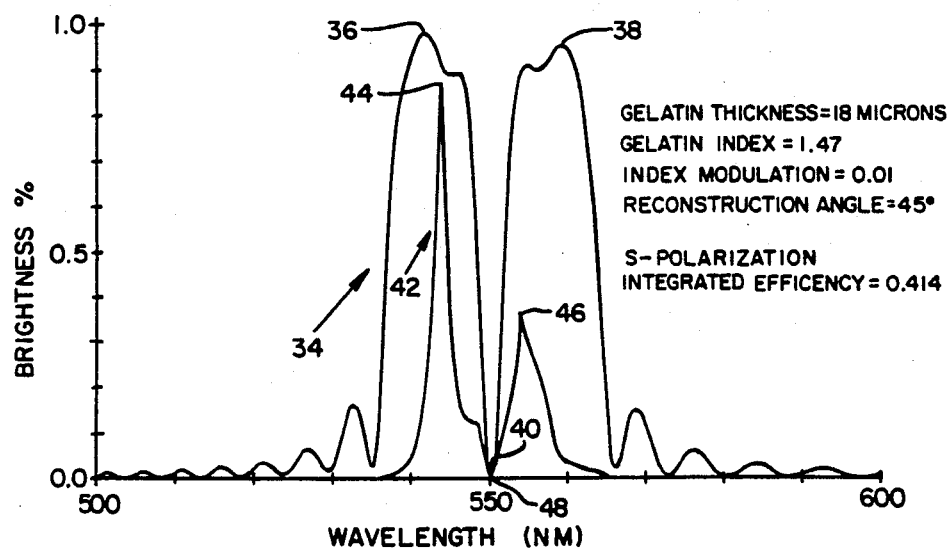
FIG. 3 is the diffraction efficiency characteristic of FIG. 2B superimposed on the integrated efficiency characteristic for the head-center position of a head-up display of the invention.

FIG. 3 shows the integrated efficiency characteristic 42 for the P-53 phosphor emission characteristic 30 of FIG. 2A and hologram diffraction efficiency characteristic 34 of FIG. 2B for the head-center position in head-up display system 10. Since it changes spectral positions in response to changes in head position and look angle, diffraction efficiency characteristic 34 is superimposed on FIG. 3 to show the relationship between it and the integrated efficiency characteristic 42 for only the head-center position. FIG. 3 shows that the integrated efficiency characteristic 42 has a primary peak 44 at a wavelength of about 544 nanometers and a secondary peak 46 at a wavelength of about 554 nanometers. The center dip 40 of diffraction efficiency characteristic 34 causes a null 48 at a wavelength of about 550 nanometers in the integrated efficiency characteristic 42.

Integrated efficiency characteristic 42 indicates that the phosphor energy available in the vicinity of 550 nanometers is not reflected by the hologram. Introducing the center dip 40 in hologram reflection characteristic 34 reduces some of the available phosphor energy in the region of 550 nanometers. This is a consequence of using the center dip approach in widening the hologram reflection bandwidth. Integrated efficiency characteristic 42 indicates that about 42% of the total phosphor energy is, however, reflected to pilot 28.

The display brightness uniformity is determined by numerically computing the area under the integrated efficiency characteristic for each combination of head position and look angle of interest. The result is a set of numbers representing the integrated efficiencies for the head positions and look angles analyzed. Variations among the computed integrated efficiencies represent the variations in brightness uniformity. Since the phosphor emission characteristic remains spectrally fixed, the integrated efficiency characteristic for any combination of head position and look angle can be optimized by changing the wavelength spacing between the hologram diffraction efficiency peaks. The desired display brightness uniformity is determined by computing the integrated efficiencies for a plurality of trial hologram diffraction efficiency characteristics of different wavelength separations between diffraction efficiency peaks. The set of integrated efficiencies that provide the required brightness uniformity for all desired head positions and look angles dictates, therefore, the optimum wavelength separation between the two diffraction efficiency peaks 36 and 38. A hologram having diffraction efficiency characteristic 34 provides essentially imperceptible brightness variation over about a 30 nanometer bandwidth, which corresponds to a total vertical field of view of about 24°.

The center dip characteristic shown in FIG. 2B reduces the integrated efficiency from the design eye location to about 40% as compared to 50% for a hologram of wide bandwidth design. An integrated efficiency of 40% from the design eye achieves a contrast ratio in excess of 1.3 to 1 with only 7,500 foot-lamberts of light emitted from a cathode ray tube. Since a typical cathode ray tube designed for head-up display applications is capable of emitting a peak output of about 18,500 foot-lamberts, the center dip hologram design reduces the beam current requirements necessary to achieve the desired contrast ratio and thereby increases its usable life.

An integrated efficiency between the vertical limits of a head motion volume of about 7.6 cm is 28%, which results in a brightness uniformity of about ±25% over the entire head motion volume and across the total field of view. A variation of ±25% in brightness is virtually imperceptible to the human eye.

Diffraction efficiency variations of less than 4% across a center dip hologram in the head-center position are easily achievable because its performance is insensitive to holographic recording material thickness variations about an 18 micron nominal thickness.

The average photopic transmission through combiners 12 and 14 is about 83% with a ±2.4% variation, when computed for any location in the head motion volume for any look angle within the total field of view.

Center Dip Hologram Construction Geometry

The holograms included in combiners 12 and 14 are constructed in a manner that simulates their positions and orientation relative to the design eye location of the aircraft cockpit. Constructing the holograms in this manner maximizes the diffraction efficiency and brightness uniformity for head positions around the design eye location.

Each one of holograms 20 and 22 is exposed twice by a point source of coherent light from locations above and below the design eye location. Changing the distance between the exposure locations of the point source changes the wavelength separation between the diffraction efficiency peaks. Changing the distance between the exposure locations of the point source and computing the integrated efficiency characteristic is, therefore, one way of determining the wavelength spacing between the peaks in a diffraction efficiency characteristic that provides optimum brightness uniformity.

Figure 4A:
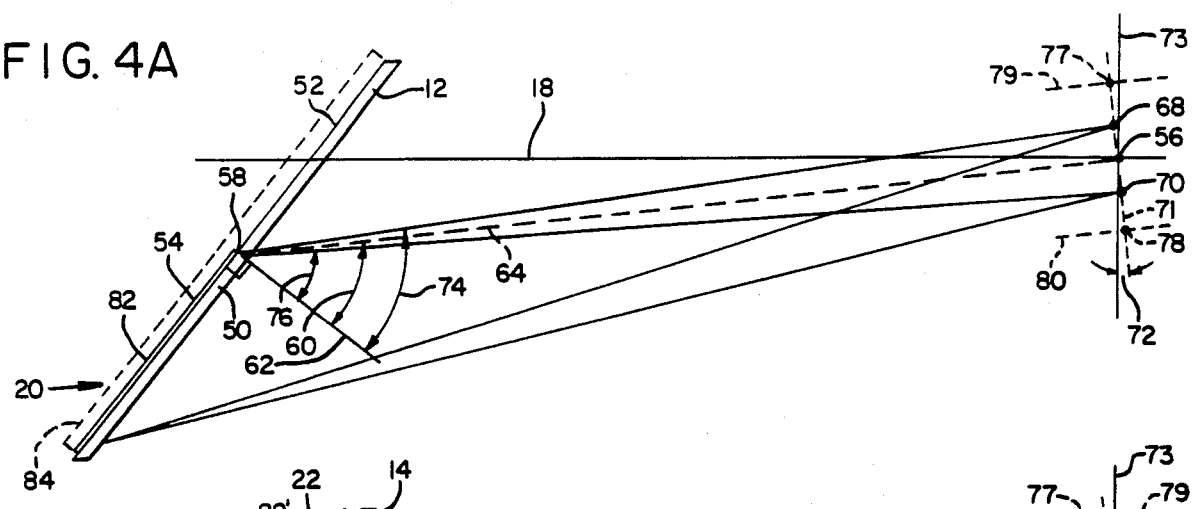
FIGS. 4A and 4B are diagrams showing the construction geometries for the holographic optical elements comprising the respective lower and upper combiners of the head-up display system of FIG. 1.
Figure 4B:
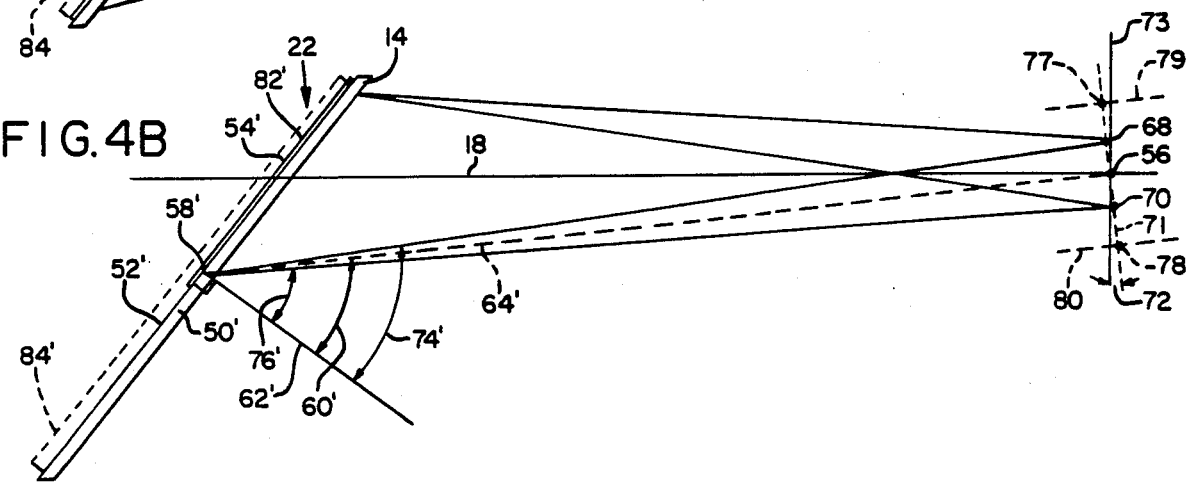

FIGS. 4A and 4B show the construction geometries for, respectively, lower combiner 12 and upper combiner 14. With reference to FIG. 4A, lower combiner 12 comprises a first transparent substrate 50, such as glass, on whose surface 52 is deposited an 18 micron thick layer of holographic recording material 54 (shown in enlarged scale in FIG. 4A), such as dichromated gelatin. The thickness of substrate 50 is about 0.3 cm. The exposed recording material 54 covers about 50% of the surface area of the lower portion of substrate 50 as shown. Lower combiner 12 is positioned about 44 cm from location 56, which corresponds to the design eye location, to the midpoint location 58 along the length of substrate 50, which length is about 25 cm. Combiner 12 is inclined at an angle 60 of 45° that is measured between surface normal 62 and line 64, which connects locations 56 and 58.

Holographic recording material 54 is illuminated during first and second exposures of typically 250 mj/cm² by a laser point source (not shown) having a wavelength of 515 nanometers, the first and second exposures being accomplished at the respective locations 68 and 70 along a plane 71 that intersects location 56. Plane 71 is inclined at an angle 72 of about 6° relative to the vertical reference line 73. Location 68 is about 1.9 cm above location 56 and provides a construction angle 74 of 47.5°. Location 70 is about 1.9 cm below location 56 and provides a construction angle 76 of 42.5°. Locations 77 and 78 define the respective upper and lower vertical limits of the head motion volume. The distance between locations 77 and 78 is about 7.6 cm. The horizontal limits (not shown) of the head motion volume are about ±7.6 cm relative to location 56 but are of little importance herein for diffraction efficiency purposes. The depth limits of the head motion volume are about ±7.6 cm relative to locations 77 and 78 along lines 79 and 80, which are parallel to line 64.

During hologram processing, the center dip 40 is tuned to the desired wavelength of about 550 nanometers by swelling the recording material in accordance with known techniques.

Hologram 20 is formed with a single point source as described in copending patent application of Robert B. Wood and Robert F. Cannata, Ser. No. 06/349,924, now U.S. Pat. No. 4,582,389 filed Feb. 18, 1982, for "Holographic Device." During each exposure, the light rays emanating from the point source pass through substrate 50 and separate into major transmission and minor reflection components of, respectively, relatively high and low light intensities at the substrate noncontacting surface 82 of the gelatin recording material 54. This is the result of the difference between the index of refraction of air and the index of refraction of the gelatin at the air-gelatin interface. The reflected light components propagate back through recording material 54 and interact with the light rays emanating from the point source to form hologram 20 having a fringe pattern that is essentially parallel to, i.e., has very few fringe lines intersecting surface 52 of, substrate 50. A fringe pattern of this character forms a combiner that presents to the pilot a flare-free outside scene. A second transparent substrate 84, which is shown in phantom in FIG. 4A, is cemented to substrate 50 to seal hologram 20.

Exposing recording material 54 with a point source located near the design eye location 56 causes the Bragg angle to vary continuously from top to bottom of lower combiner 12 as it would when the pilot changes his look angle from a fixed head position. The Bragg wavelength is, therefore, effectively fixed across the combiner surface. Brightness variations resulting from changes in look angle are thereby virtually eliminated when the lower combiner is viewed from the design eye location. The only remaining source of brightness variation results from changes in head motion along plane 71, which motion changes the angle of incidence with respect to surface of lower combiner 12. The design of hologram 20 with a center dip, however, solves this problem as described above.

Although it is directed to FIG. 4A in the construction of hologram 20, the above description also applies to FIG. 4B in the construction of hologram 22, with similar items being identified by identical reference numerals followed by primes. The differences in the construction of hologram 22 are that the distance between locations 56 and 58' along line 64' is about 51.6 cm and recording material 54' covers about 60% of the surface area of the upper portion of substrate 50'.

Figure 5A:
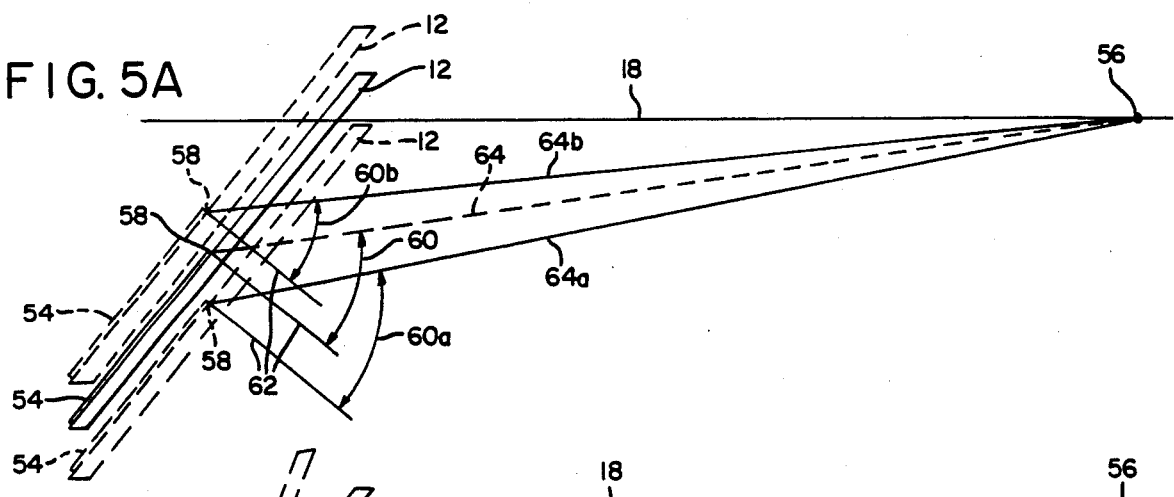
FIGS. 5A and 5B are diagrams showing alternative construction geometries of the lower combiner of FIG. 4A.
Figure 5B:
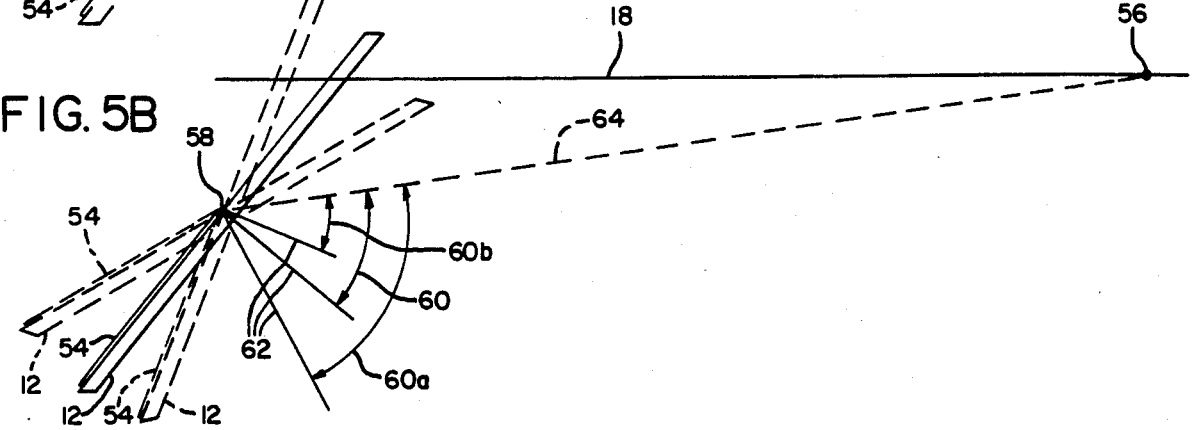

FIGS. 5A and 5B show alternative construction geometries for lower combiner 12 for obtaining peaks 36 and 38 of diffraction efficiency characteristic 34. The description set forth below also applies to upper combiner 14.

FIG. 5A shows the exposure geometry for a single point source fixed at location 56. Combiner 12 is exposed twice in different translational positions relative to location 56, the first and second positions corresponding to about 1.9 cm vertical translations, respectively, above and below the position of combiner 12 in FIG. 4A.

FIG. 5B shows the exposure geometry for a single point source fixed at location 56. Combiner 12 is exposed twice in different angular positions relative to location 56, the first and second positions corresponding to about 2.5° (shown in enlarged scale in FIG. 5B) counterclockwise and clockwise rotations, respectively, about location 58 as respects the position of combiner 12 in FIG. 4A.

The parameters corresponding to the first and second exposure positions of FIGS. 5A and 5B are designated by identical reference numerals followed by, respectively, lower case "a" and "b." Exposing recording material 54 at the first position of either alternative construction geometry creates diffraction efficiency peak 36, which corresponds to angle 60b of 42.5°. Exposing recording material 54 at the second position of either alternative construction geometry creates diffraction efficiency peak 38, which corresponds to angle 60a of 47.5°.

It will be obvious to those having skill in the art that many changes may be made in the above-described details of the preferred embodiment of the present invention. For example, each display system is designed for installation in a particular aircraft cockpit. The dimensions and orientation of the display system must be optimized, therefore, for its end use configuration. As another example, the holographic optical element can be constructed by laminating together face-to-face two holograms of different peak wavelengths separated by an amount to form the center dip characteristic. The scope of the present invention, therefore, should be determined only by the following claims.

What is claimed is:

1. In an optical display system comprising a holographic optical element that has a viewing surface and is operable to superimpose image information on a scene viewed by an observer, the improvement comprising:
 a holographic optical element having holographic fringes that define two diffraction efficiency peaks, thereby to provide to the observer a display of the image information with enhanced brightness uniformity across the viewing surface.

2. The display system of claim 1 in which the holographic optical element is recorded in holographic recording material that is interposed between two substantially flat transparent substrates.

3. The display system of claim 1 in which the holographic optical element is recorded in holographic recording material, and the number of holographic fringes intersecting the surface of the holographic optical element is limited so that a flare-free scene is viewed by the observer.

4. The display system of claim 1 in which the diffraction efficiency peaks correspond to different wavelengths of light that are separated by an amount of between about 10 and 20 nanometers.

5. In an optical display system comprising a holographic optical element, a method of constructing the holographic optical element, comprising:
 depositing holographic recording material on a surface of a substrate;
 recording in the recording material a first fringe pattern resulting from the interaction of first exposure and first reflected rays of coherent light, one of the first exposure light rays striking the substrate at a reference location to form a first angle relative to the surface normal at the reference location; and
 recording in the recording material a second fringe pattern resulting from the interaction of second exposure and second reflected rays of coherent light, one of the second exposure light rays striking the substrate at the reference location to form a second angle relative to the surface normal.

6. The method of claim 5 in which the first and second exposure light rays are of the same wavelength.

7. The method of claim 6 in which the first and second exposure light rays emanate from a single source, and the first and second angles are formed by changing the relative orientation of the single source and the substrate.

8. The method of claim 6 in which the first and second exposure light rays emanate from a single source located at a fixed position, and the first and second angles are formed by positioning the substrate relative to the single source.

9. The method of claim 5 in which the recording material has a substrate noncontacting surface of a first refractive index, the substrate noncontacting surface defining an interface between the recording material and a medium of a second refractive index, and the first and second reflected light rays are developed by reflection at the interface as the respective first and second exposure light rays propagate across the interface.

10. The method of claim 9 in which the medium is air.

11. An optical display system comprising:
 image source means for providing light image information, the image source means including a light source having an emission peak corresponding to a first wavelength; and
 optical element means for displaying the image information on a viewing surface to an observer, the optical element means including a holographic optical element that has two diffraction efficiency peaks corresponding to second and third wavelengths of light that differ from the first wavelength, thereby to display to the observer image information of perceptibly uniform brightness across the viewing surface.

12. The optical display system of claim 11 in which the light rays of the first wavelength strike the holographic optical element on its surface that is proximal to the observer.

13. The optical display system of claim 11 in which the first wavelength is disposed between the second and third wavelengths for any point on the viewing surface.

14. A method of constructing a holographic optical element for use in an optical display system in superimposing image information on a scene viewed by an observer, the holographic optical element having a reflection characteristic and the image information being emitted from a light source having an emission characteristic with an emission peak corresponding to a first wavelength, comprising:
 formulating a reflection characteristic for a holographic optical element by including in it two diffraction efficiency peaks corresponding to first and second wavelengths;
 determining an optimum separation between the diffraction efficiency peaks that enables an observer to position his head within a head motion volume and view the image information without perceiving a variation in brightness; and
 exposing holographic recording material to form the holographic optical element having the reflection characteristic with the determined optimum separation of diffraction efficiency peaks.

15. The method of claim 14 in which the holographic recording material is exposed by light rays emanating from a single point source, the first and second wavelengths being determined by exposing the holographic recording material at different angular inclinations of the point source relative to a substrate on which the recording material is deposited.

16. The method of claim 14 in which the reflection characteristic is formulated by computing the multiplication products of the emission characteristic and a plurality of trial reflection characteristics, each one of the trial reflection characteristics having different separations between its diffraction efficiency peaks, thereby to determine the optimum separation that provides optimum brightness uniformity.

17. The method of claim 16 in which the emission characteristic is that of a cathode ray tube phosphor.

18. A head-up display system, comprising:

image source means for providing light image information of a first wavelength; and optical element means for displaying the image information to an observer, the optical element means comprising a combiner that includes first and second spaced-apart, at least partly overlapping holographic optical elements that form a viewing surface, each holographic optical element having holographic fringes that define two diffraction efficiency peaks corresponding to second and third wavelengths of light that are different from the first wavelength, thereby to display image information that the observer perceives as being uniformly bright over the viewing surface.

19. The head-up display of claim 18 in which the first wavelength is spectrally positioned between the second and third wavelengths.

* * * * *